3,397,131
METHOD OF PREPARING ORGANOTIN COMPOUNDS

John G. Kircher, Worthington, James L. McFarling, Columbus, Robert E. Wyant, Delaware, and Ernest J. Kahler, Columbus, Ohio, assignors to the United States of America as represented by the United States Atomic Energy Commission
No Drawing. Filed Nov. 13, 1964, Ser. No. 411,168
3 Claims. (Cl. 204—158)

ABSTRACT OF THE DISCLOSURE

A method of preparing organotin compounds by washing finely divided tin with a dilute halogen, mixing the tin with an alkyl halide, and adding concentrated HBr or HCl. The resulting mixture is then heated and subjected to gamma radiation, causing formation of the organotin compounds.

---

This invention relates to a method of preparing organotin compounds. In more detail the invention relates to a method of preparing alkyltin halides. In still more detail the invention relates to a method of preparing di-n-butyltin dibromide.

Many organotin compounds are prepared by an indirect method involving a Grignard reaction. While compounds such as di-n-butyltin dibromide can be prepared in this manner, the preparation is quite costly. In view of the utility of dialkyltins as intermediates in the preparation of stabilizers for plastics and chlorinated rubber, and materials for the treatment of poultry for worms, a direct, less costly method would have obvious commercial utility.

It is an object, therefore, of the present invention to develop a method of preparing dialkyltins, and particularly di-n-butyltin dibromide, which is less costly than methods presently employed.

It is a more specific object of the present invention to develop a method of using radiation to prepare dialkyltins whereby a better yield is obtained than heretofore.

These and other objects of the present invention are attained by washing finely divided tin with dilute HBr or HCl, combining an alkyl halide with the tin, adding HBr or HCl to the mixture, and subjecting the mixture to gamma radiation at an elevated temperature. While either the acid wash or inclusion of the additive taken alone will increase the yield from the radiation treatment, both expedients are essential for best results.

In accordance with a preferred embodiment of the invention, finely divided tin having a mesh size of −40 to +100 mesh is washed with dilute hydrochloric acid for 30 minutes. This is accomplished by slurrying the powdered tin with dilute hydrochloric acid, washing the tin free of hydrochloric acid and then drying the powder in a vacuum. Approximately 25 ml. of HBr gas per 22 grams of halide are then added to a mixture of 1-bromobutane and tin by condensing the gas on top of the mixture. About six parts by weight of tin to one part of alkyl halide are present in this mixture. The mixture is then heated to reflux temperature (101° C. for n-butylbromide) and subjected to about $1 \times 10^6$ rads of gamma radiation. Following exposure the liquid phase of the reaction mixture is separated from the unreacted tin by filtration. This liquid product is at least 80% dibutyltin dibromide, smaller quantities of butyltin tribromide, tributyltin bromide, and tin tetrabromide also being produced.

As will be shown subsequently, this reaction will not proceed in the absence of radiation and a certain amount of radiation is necessary before the reaction proceeds at an appreciable rate. The minimum amount of radiation necessary for satisfactory results is about $1 \times 10^6$ rads of gamma radiation. This is also about the optimum amount since competing reactions occur at higher exposures which serve to decrease the yield.

Even with the radiation, however, the reaction does not proceed satisfactorily unless the tin powder is thoroughly washed with dilute hydrochloric or hydrobromic acid or hydrochloric acid or hydrobromic acid is added to the reaction mixture. Since HBr shows no particular advantage over HCl for the acid wash, the indicated choice is HCl. However, hydrobromic acid is the indicated choice as additive. The additive can be added in gaseous form or as a concentrated solution provided calcium chloride is added to take up the water.

It is also essential that elevated temperatures be employed. At temperatures below about 90° C. the yield is much lower than at higher temperatures. Accordingly temperatures between about 90° C. and the reflux temperature (101° C. for n-butylbromide) should be employed. For convenience the reflux temperature is preferred.

Other factors affecting the yield are the tin to alkyl halide ratio, the washing time, and the particle size of the tin powder. When the tin to halide ratio is above 7:1, the yield decreases with greater amounts of tin. Below the 7:1 ratio and down to a 4:1 ratio there is little difference in the yield with changes in the ratio. In general increased yields are obtained by increasing the washing time. However, above about 30 minutes, the increased yield is not sufficient to justify the increased washing time. Also as a result of experiments which are not described herein, it has been discovered that decreasing the particle size increases the yield slightly from the reaction down to about −60 to +100 mesh material. Below this size considerably higher proportions of the halide to the tin are required due to the greater bulk of the tin powder.

In addition to 1-bromobutane, the process of the present invention gives improved results when applied to the reaction of 1-bromopentane and 1-bromohexane with finely divided tin. On the other hand, no reaction between 1-bromopropane or 1-chlorobutane and tin is noted even when the entire process of the present invention is applied. Since a surface effect on the tin is involved, it is believed that washing the tin and employing an additive according to the present invention will increase the yield from any reaction which would otherwise proceed. This invention, however, will not make reactions proceed which would not proceed to at least a slight extent in the absence of the acid wash and additive.

The following specific examples are given to illustrate the invention. In these examples the term "G-value" is a measure of radiation yield being defined as the amount of product formed per unit amount of radiation absorbed. Unless otherwise stated, in all tests 1-bromobutane was reacted with powdered tin at a dose rate of $5.6 \times 10^5$ rads/hour from a cobalt source under a head atmosphere of air. In a first series of experiments the products were identified qualitatively using thin-layer chromatography with silica gel as the substrate and a developer consisting of a mixture of 1 volume percent acetic acid, 20 volume percent ethanol, and 79 volume percent acetone. The spots were made visible using dithizone (diphenylthiocarbazone). Through this technique it was possible to determine what types of compounds were formed and to estimate product ratios. In subsequent experiments the products were determined quantitatively using gas-liquid chromatography. Since direct analysis of the butyltin bromides by gas-liquid chromatography proved to be unsatisfactory, the butyltin bromides in the reaction mixture were converted to the corresponding methyl compounds by reacting the butyltin bromides with methylmagnesium bromides and gas-liquid chromatography applied to this reaction mixture.

The first table illustrates the advantages obtained by acid wash and by employing an additive. In these experiments 20-mesh tin and a temperature of 90° C. were employed and concentrated HBr was added to saturate the halide.

TABLE I

| Expt. | Absorbed Dose, rads | Tin Treatment | Halide Used, g. | Non-volatile Products, g. | G-Value [1] |
|---|---|---|---|---|---|
| 1 | $0.71 \times 10^6$ | None | 27.91 | 0.70 | 15.3 |
| 2 | $2.3 \times 10^6$ | do | 29.01 | 7.09 | 46 |
| 3 | $0.71 \times 10^6$ | HCl wash | 25.33 | 2.29 | 52 |
| 4 | $2.1 \times 10^6$ | do | 26.00 | 14.02 | 106 |
| 5 | [2] | do | 29.34 | 0.07 | |
| 6 | $0.71 \times 10^6$ | HBr wash | 28.00 | 2.00 | 42 |
| 7 | $2.1 \times 10^6$ | do | 27.75 | 17.54 | 126 |
| 8 | [2] | do | 27.55 | 0.03 | |
| 9 | $0.71 \times 10^6$ | HBr in halide | 29.34 | 7.84 | 145 |
| 10 | $2.1 \times 10^6$ | do | 32.00 | 24.18 | 142 |
| 11 | [2] | do | 20.13 | 0.61 | |

[1] To facilitate calculations of G-values the nonvolatile product was assumed to have the structure $R_2SnBr_2$.
[2] Blanks run for the same time as irradiation experiments at $3 \times 10^6$ rads.

The next table compares the effectiveness of HBr and HCl as additives with and without washing. 20-mesh tin was employed and the total dose was $1.5 \times 10^6$ rads in all experiments.

TABLE II

| Addition | Tin | Weight, g Halide | Weight, g Tin | Weight, g Product |
|---|---|---|---|---|
| HBr | Washed | 19.55 | 131.44 | 9.3 |
| | Unwashed | 23.9 | 128.29 | 10.0 |
| HCl | Washed | 24.9 | 131.44 | 11.55 |
| | Unwashed | 25.68 | 133.48 | 10.31 |

Use of the washed tin gave G-values of approximately 180 while the unwashed tin gave yields of about 145.

A large number of experiments have also been performed in which the total radiation dose was varied. Table III gives the results obtained when the radiation dose is varied on acid-washed tin in the absence of an additive.

TABLE III*

| Expt. | Total Dose,[1] rads | Weight Used, g. Halide | Weight Used, g. Tin | Nonvolatile Products, g. | Wt. of Product per wt. of Tin, $\times 10^3$ |
|---|---|---|---|---|---|
| 1 | $1.0 \times 10^5$ | 31.25 | 131.85 | 0.15 | 1.14 |
| 2 | $2.5 \times 10^5$ | 24.00 | 136.0 | 0.40 | 2.95 |
| 3 | $2.5 \times 10^5$ | 24.12 | 145.33 | 0.25 | 1.73 |
| 4 | $3.75 \times 10^5$ | 24.10 | 140.65 | 0.58 | 4.12 |
| 5 | $5.0 \times 10^5$ | 21.70 | 128.75 | 2.43 | 18.8 |
| 6 | $5.0 \times 10^5$ | 26.24 | 157.0 | 1.78 | 11.3 |
| 7 | $1.0 \times 10^6$ | 18.40 | 125.68 | 4.28 | 34.0 |
| 8 | $1.0 \times 10^6$ | 18.99 | 125.63 | 4.01 | 31.8 |
| 9 | $2.0 \times 10^6$ | 21.85 | 127.22 | 10.28 | 80.7 |
| 10 | $2.0 \times 10^6$ | 26.95 | 130.5 | 12.09 | 92.4 |
| 11 | $4.0 \times 10^6$ | 27.55 | 138.35 | 21.85 | 159 |
| 12 | $6.0 \times 10^6$ | 32.30 | 188.73 | 33.72 | 178 |

*Hydrochloric-acid-washed 35-mesh tin and a temperature of 101° C. were used in all of the experiments.
[1] Dose rate was $5 \times 10^5$ rads per hr. in all experiments.

Table IV gives the results obtained at different radiation doses when HBr is employed as an additive in comparison with the results obtained with no additive. Hydrochloric-acid-washed tin and a temperature of 101° C. were used in all experiments.

TABLE IV

| Expt. | Dose, rads | Additive | Tin | Halide | Product Weight, g. | Wt. of Product per Unit Tin, $\times 10^4$ |
|---|---|---|---|---|---|---|
| 1 | $1.75 \times 10^5$ | None | 136.00 | 24.00 | 0.40 | 29 |
| 2 | $1.75 \times 10^5$ | HBr | 132.38 | 26.72 | 8.52 | 645 |
| 3 | $3.50 \times 10^5$ | None | 128.75 | 21.70 | 2.43 | 188 |
| 4 | $3.52 \times 10^5$ | HBr | 130.25 | 25.70 | 9.75 | 750 |
| 5 | $0.70 \times 10^6$ | None | 125.68 | 18.40 | 4.28 | 339 |
| 6 | $0.71 \times 10^6$ | HBr | 131.85 | 24.80 | 7.62 | 578 |
| 7 | $1.41 \times 10^6$ | None | 127.22 | 21.85 | 10.28 | 809 |
| 8 | $1.41 \times 10^6$ | HBr | 135.64 | 24.12 | 9.74 | 714 |
| 9 | $2.12 \times 10^6$ | HBr | 129.60 | 25.37 | 16.24 | 1,250 |
| 10 | $2.83 \times 10^6$ | None | 138.35 | 27.55 | 21.85 | 1,580 |

These results show that the hydrobromic acid has its greatest effect on promoting the reaction at doses below $1 \times 10^6$ rads and little, if any, effect at doses of about $3 \times 10^6$ rads. Since it is important to keep the dose as low as possible while obtaining a reasonable yield, use of the additive is important for best results.

The following table also shows the effect of varying the dose when HBr is used as an additive and gives comparative tests when no HBr is used and when no radiation is used but HBr is used.

TABLE V.—EFFECT OF HBr ADDITIVE ON RADIATION-INDUCED YIELDS OF ORGANOTIN COMPOUNDS*

| Expt. | Weight of Halide, g. | Additive [1] | Absorbed Dose, $10^{-5}$ rads | Weight of Product, g. |
|---|---|---|---|---|
| 1 | 22.48 | HBr | 0.87 | 0.17 |
| 2 | 22.68 | HBr | 1.73 | 1.37 |
| 3 | 22.90 | HBr | 5.18 | 7.27 |
| 4 | 22.45 | HBr | 10.4 | 14.42 |
| 5 | 22.34 | | 5.18 | 0.29 |
| 6 | 22.47 | HBr | [2] | 0.06 |

*All samples used 130.0 g. of washed 20-mesh tin and were run in sealed capsules at reflux temperature (101° C.). The halide was 1-bromobutane.
[1] HBr was added from a 25-ml. gas bulb to an evacuated capsule. Approximately 0.08 g. of HBr was added.
[2] This sample was refluxed 24 hrs. in the absence of radiation.

The following table shows the effect of varying the ratio of tin to alkyl halide. Acid-washed tin and reflux temperatures were employed.

TABLE VI.—EFFECT OF TIN-ORGANIC BROMIDE RATIO ON YIELD

| Expt. | Dose, rads | Weight Used, g. Tin | Weight Used, g. Halide | Tin/Halide Ratio | Product Weight, g. | Wt. of Product per Unit Tin, $\times 10^4$ |
|---|---|---|---|---|---|---|
| 1 | $.68 \times 10^6$ | 130.0 | 6.1 | 21.6/1 | 1.10 | 85 |
| 2 | $.70 \times 10^6$ | 130.0 | 12.3 | 10.5/1 | 2.16 | 166 |
| 3 | $.71 \times 10^6$ | 130.0 | 18.5 | 7/1 | 3.90 | 300 |
| 4 | $.71 \times 10^6$ | 130.0 | 24.8 | 5.3/1 | 3.75 | 288 |
| 5 | $.71 \times 10^6$ | 130.0 | 31.1 | 4.2/1 | 4.30 | 330 |

The following table shows the effect of varying the temperature on the yield of alkyl tin. Acid-washed tin was employed in all tests. In these experiments a quantitative determination of the products was made.

TABLE VII.—EFFECT OF TEMPERATURE ON PRODUCT YIELD AND PRODUCT DISTRIBUTION*

| Expt. | Temp., C. | Weight of Halide, g. | Weight of Product, g. | Yield, percent of product | | | |
|---|---|---|---|---|---|---|---|
| | | | | $(n-Bu)_3SnBr$ | $(n-Bu)_2SnBr_2$ | $(n-Bu)SnBr_3$ | $SnBr_4$ |
| TIN A | | | | | | | |
| 1 | 70 | 22.80 | 0.544 | 0 | 70.4 | 26.9 | [1] 2.7 |
| 2 | 75 | 22.76 | 1.316 | 0.3 | 76.2 | 14.9 | 8.6 |
| 3 | 80 | 22.76 | 1.595 | 0.4 | 79.6 | 13.7 | 6.3 |
| 4 | 83 | 22.69 | 1.542 | 0.3 | 74.6 | 15.2 | 9.9 |
| 5 | 88 | 22.83 | 5.770 | 1.9 | 85.8 | 1.1 | 11.2 |
| 6 | 90 | 22.52 | 8.234 | 2.9 | 84.8 | 0.6 | 11.7 |
| 7 | 95 | 22.40 | 9.725 | 3.8 | 85.9 | 0.8 | 9.5 |
| 8 | 100 | 22.26 | 10.274 | 3.5 | 83.0 | 1.6 | 11.9 |
| TIN B | | | | | | | |
| 1 | 70 | 23.91 | 0.289 | | | | |
| 2 | 80 | 22.73 | 0.303 | 0.4 | 45.0 | 43.3 | 11.3 |
| 3 | 85 | 22.82 | 1.154 | | | | |
| 4 | 90 | 22.49 | 4.217 | 1.3 | 86.7 | 3.1 | 8.9 |
| 5 | 100 | 22.44 | 4.707 | 1.8 | 87.5 | 1.7 | 9.0 |

* 130 g. of tin used in all experiments. All samples irradiated to $2 \times 10^6$ rads using 1-bromobutane.
[1] This value is low because of an experimental error.

Other compounds have also been tested as shown by the following table.

TABLE VIII.—RADIATION-INDUCED REACTION OF ALKYL HALIDES AND TIN*

| Expt. | Halide | Weight of Halide, g. | Temp., C. | Exposed Dose, rads | Weight of Product, g. |
|---|---|---|---|---|---|
| 1 | 1-bromobutane | 22.34 | 101 | 7.35×10$^5$ | 0.29 |
| 2 | 1-chloropentane | 16.20 | 106 | 4.8×10$^5$ | 0.0 |
| 3 | 1-bromopentane | 21.71 | 128 | 4.8×10$^5$ | 7.15 |
| 4 | 1-bromohexane | 22.37 | 155 | 4.8×10$^5$ | 0.58 |

*All samples used 130.0 g. of washed 20-mesh tin.

It will be understood that the invention is not to be limited to the details given herein but that it may be modified within the scope of the appended claims.

What is claimed is:

1. A method of preparing alkyltin halides comprising washing finely divided tin with an acid selected from the group consisting of dilute HCl and dilute HBr, introducing a concentrated acid selected from the group consisting of HCl and HBr into an alkyl halide selected from the group consisting of 1-bromobutane, 1-bromopentane, and 1-bromohexane, combining the washed tin with the alkyl halide in a proportion of between four parts by weight and seven parts by weight of tin to one of alkyl halide, heating the mixture to at least 90° C. and subjecting the mixture to about 1×10$^6$ rads of gamma radiation.

2. A method of preparing dibutyltin dibromide comprising washing —40 to +100 mesh tin powder for 30 minutes with dilute hydrochloric acid, introducing gaseous HBr into 1-bromobutane, combining the washed tin with the 1-bromobutane in a proportion of six parts by weight of tin to one part of 1-bromobutane, heating the mixture to reflux temperature, and subjecting the mixture to about 1×10$^6$ rads of gamma radiation.

3. A method of preparing alkyltin halides comprising: mixing finely divided tin with an alkyl halide, said tin being in a proportion of between 4 parts by weight and 7 parts by weight to 1 part of alkyl halide, adding a halogen acid selected from the group consisting of HCl and HBr to said mixture, heating said mixture to at least 90° C. and subjecting said mixture to at least 1×10$^6$ rads of gamma radiation.

References Cited

UNITED STATES PATENTS 2,952,596  9/1960  Rylander et al. _____ 204—158

HOWARD S. WILLIAMS, *Primary Examiner.*